UNITED STATES PATENT OFFICE.

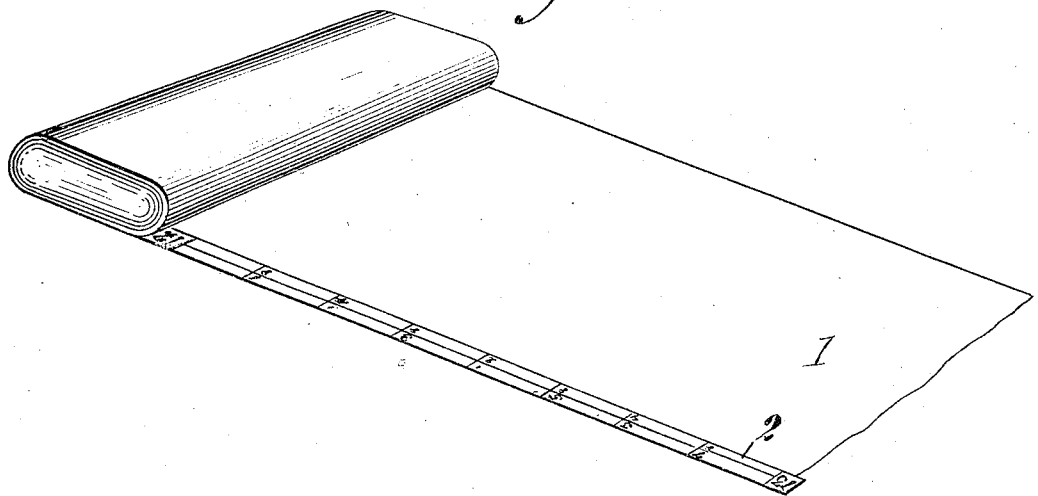

SHEPPARD D. JORDAN, OF DILLON, SOUTH CAROLINA.

TAPE-MEASURE.

No. 886,814.      Specification of Letters Patent.      Patented May 5, 1908.

Application filed February 26, 1907. Serial No. 359,382.

*To all whom it may concern:*

Be it known that I, SHEPPARD D. JORDAN, a citizen of the United States, residing at Dillon, in the county of Marion and State of South Carolina, have invented new and useful Improvements in Tape-Measures, of which the following is a specification.

The invention relates to an improved means for measuring fabrics adapted to be put up in rolls or bolts, comprising essentially a tape measure designed to be assembled with the fabric during its arrangement in roll form and serving when in position to indicate the number of yards remaining in the roll and further providing for the convenient measuring of any number of yards from the roll if desired for sale.

The main object of the invention therefore is the provision of a tape measure adapted to be assembled with the fabric during the process of rolling and marked in yards and fractions of a yard, the yard indicating numerals successively progressing toward the free end of the fabric, whereby the tape measure will indicate the number of yards remaining in the roll at any time.

The invention will be fully described in the following specification, reference being had therein to the accompanying drawings, in which:—

Figure 1 is a perspective view illustrating the application of my improved tape measure to a bolt of fabric. Fig. 2 is a partial plan showing the face of the tape measure. Fig. 3 is a broken bottom plan of the same.

Referring to the drawings, the tape measure of the present invention is designed for application to a bolt or roll of fabric 1, and comprises an elongated strip 2 of readily severable material, such as cloth or paper, on the face or upper side of which at yard distances is printed a series of successively progressing numerals to indicate the yards.

The strip is divided by a central longitudinally arranged line, dividing the strip into equal sections. The strip between the yard numerals is further provided with regularly spaced transverse lines, which, in the present instance are located one-eighth of a yard apart. Adjacent the transverse lines are arranged the numerals to indicate the distance of the particular line from the preceding yard numeral.

In one of the divisions formed on the face of the measure by the longitudinal line is ranged what I term a special price list 3. This particular portion of the tape is divided into a series of separated spaces by longitudinal and transverse lines, the first column transverse the measure being utilized in the successive spaces provided by the longitudinal lines for the words "Price" (meaning price per yard), "Amount" (meaning cash amount for the particular number of yards noted in the adjacent yard division), and the fraction price of a yard indicators ¼, ½, and ¾. The respective spaces in longitudinal alinement with the price column indicating successive price-values, while the remaining columns indicate the value of the particular number of yards noted on adjacent yard division in accordance with the price mark at the head of the particular transverse column. It is to be understood that one of these special price lists follows each of the yard indicating numerals on the tape, and that the fraction price per yard indicators borne by any particular list are intended to indicate the fraction price of a yard to be added to the yard price numeral at the head of any particular price column. For example, in using the price list following the yard numeral 12, and desiring to ascertain the price of 12 yards at 9 and ¾ cents per yard, the ¾ longitudinal column at the intersection of the transverse column bearing the price 9 at its head is consulted, showing the amount to be $1.17.

On the rear face of the tape measure I arrange for each yard division, what I term a general price list 4, this list occupying the full width of the measure and being divided by longitudinal and transverse lines into a series of spaces. The first column transverse the tape is marked to indicate in the first space the word "Price," the spaces longitudinally of the list in alinement with the said price space, being marked to indicate prices in successive order for which the goods may be sold. The first column transverse the tape and next to the "Price" column bears in the successive transverse spaces a series of regularly progressing numerals intended to indicate a number of yards. The remaining transverse columns bear in their respective spaces an amount indicated by the number of yards noted in the yard column space at the price indicated in the first space of the particular transverse column, the fractional indications being omitted to avoid confusing the drawing. As before stated a general price list is arranged on the rear face of the tape between each two of the yard indicating numerals, so that the user may, by reversing the tape readily determine the price for any given number of yards at a particular valuation per yard.

In use, the tape is to be applied to the fabric before the same is rolled, the zero end of the measure being alined with the end of the fabric at which the rolling operation is started. By this arrangement the yard indicating numerals progress successively toward the free end of the fabric, so that the user may by consulting the measure be advised at once of the amount of fabric in yards and fractions of a yard remaining in the roll. This is particularly advantageous in enabling the retailer to be advised of the quantity of goods in any particular roll delivered from the manufacturer, and is further and mainly useful in enabling the retailer to quickly and accurately determine the quantity of goods remaining unsold in the particular roll when taking stock. Furthermore the salesman can readily utilize the tape in cutting from the roll any desired quantity of fabric, the severing of the fabric serving to also sever the tape measure, leaving with the rolled fabric a length of measure corresponding to the quantity of fabric remaining in the roll.

Having thus described the invention what is claimed as new, is:—

1. A tape measure to be included in a roll of fabric and bearing on its face a series of yard indicating numerals, said measure also bearing on its face a special price list between each two of the yard numerals, with prices calculated for the particular yard numeral which the special price list follows.

2. A tape measure to be included in a roll of fabric and bearing on its face a series of yard indicating numerals, said measure also bearing on its face a special price list between each two of the yard numerals, with prices calculated for the particular yard numeral which the special price list follows said special list indicating the cost of the particular number of yards at varying amounts per yard and fractions of said amounts, said measure bearing on its rear face a general price list of a series of progressive numbers of yards of material at progressive amounts per yard.

In testimony whereof, I affix my signature in presence of two witnesses.

SHEPPARD D. JORDAN.

Witnesses:
   J. P. McLaurin,
   J. M. Sprunt.